W. H. CARMONT.
RESILIENT TIRE FOR ROAD VEHICLES.
APPLICATION FILED FEB. 26, 1914.
1,154,484.
Patented Sept. 21, 1915.
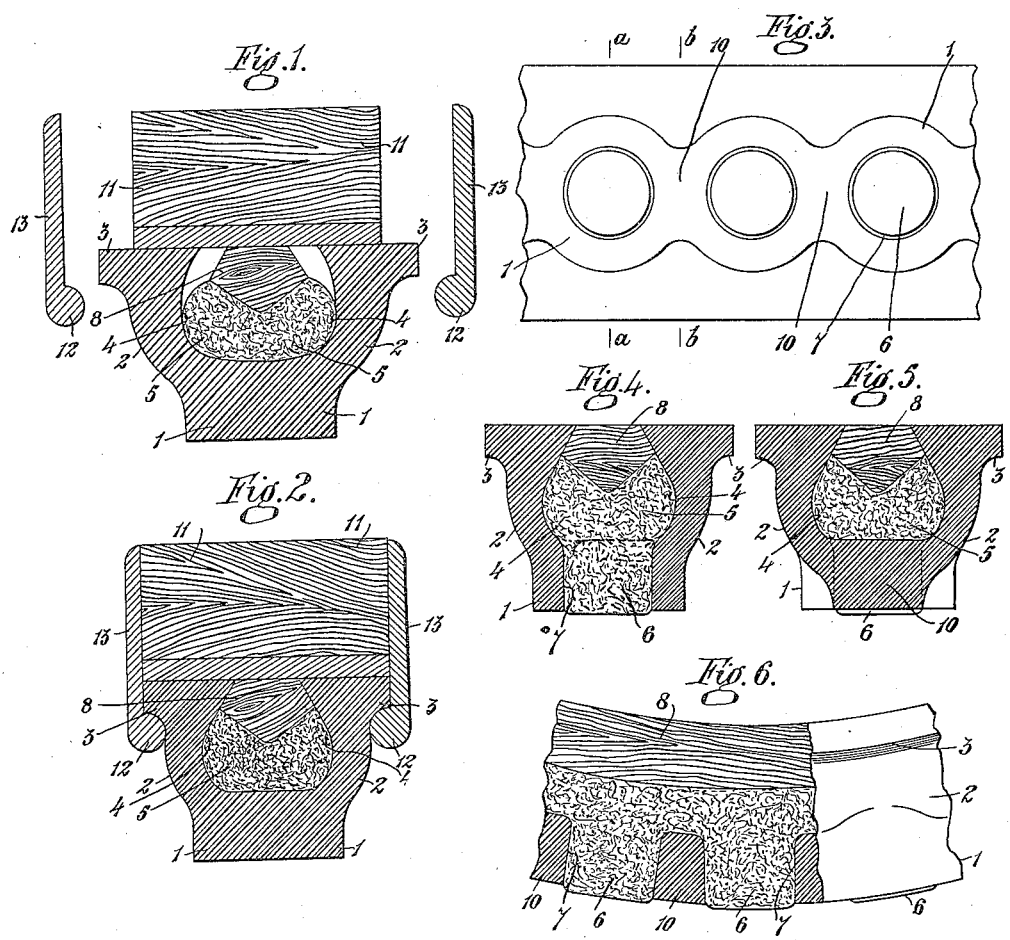

UNITED STATES PATENT OFFICE.

WILLIAM HAZELWOOD CARMONT, OF KINGSTON, ENGLAND.

RESILIENT TIRE FOR ROAD-VEHICLES.

1,154,484.    Specification of Letters Patent.    Patented Sept. 21, 1915.

Application filed February 26, 1914. Serial No. 821,214.

*To all whom it may concern:*

Be it known that I, WILLIAM HAZELWOOD CARMONT, a subject of the King of Great Britain, residing at Kingston, Surrey, England, have invented certain new and useful Improvements in Resilient Tires for Road-Vehicles, of which the following is a specification.

The object of this invention is to construct a solid resilient tire for road vehicles of the class in which a soft rubber is used as a filling for what might be termed the tire cover, which tire shall be equal in resiliency to a pneumatic tire at much less cost and have the advantage over a pneumatic tire that it will not burst or be punctured; and the chief features of the invention consist in arranging a bed or base of soft rubber under a tread surface and within what might be termed the cover, of tire rubber of the usual quality, and compressing such soft rubber within the outer cover at the same time putting a tension or stretch on the cover and in some cases forming openings in the tread surface at intervals through which openings, studs or blocks forming part of the soft rubber bed or base can pass so as to be flush with or project from the tread surface, in such manner as to communicate the pressure directly through the soft rubber studs or blocks when these are employed to the underlying soft rubber base where it is absorbed, the bed or base also absorbing the pressure put upon the remaining tread surface formed of the usual tire rubber.

My invention will be clearly understood by the following description aided by the annexed drawings in which:—

Figure 1 is a section of a cover, soft rubber bed or base, a ring (complete or in segments) positioned on a felly previous to being tightened up, the side plates for tightening the tire on the felly being also shown. Fig. 2 is a similar view to Fig. 1 but showing all the parts tightened together and as for use. These two views show my invention as constructed for an ordinary tire. Fig. 3 is a plan view of a portion of a tire constructed according to my invention and with the tread portion of the cover formed with holes into which project studs formed on the soft rubber base, and Figs. 4 and 5 are transverse sections of same taken through *a a* and *b b* respectively. Fig. 6 is a part longitudinal section of Fig. 3.

For the purpose of my invention I form the body 1 of the tire of the usual quality of tire rubber, preferably with tapered or inclined sides 2 and with flanges 3 at each side of the base for being engaged by projecting edges 12, 12, of side plates 13, 13, which are secured to a tire rim or felly 11 of ordinary construction. In this body portion 1, I form an inverted arch or other shaped recess 4 running completely around the cover in which I place a continuous ring or band 5 of best soft rubber, or it may be blocks of this material, and this ring 5, or the blocks may be formed at intervals as at Figs. 3 to 6 with upstanding studs 6, knobs or the like which enter corresponding recesses 7 formed in the body 1 of the tire, and these studs 6, knobs or their equivalents may pass right through the body so as to come out slightly beyond or may be flush with the tread surface, or they may terminate before reaching the tread so as to act as cushions for the surrounding parts of the tire body.

Under or next to the soft rubber ring 5 or blocks I fit a ring 8 preferably of wood as a complete ring or as segments of a ring, of wedge, cone, half round, or equivalent shape with its angled or curved portion in the arched recess 4 of the body and bearing against the inner or under side of the soft rubber ring 5 or blocks.

The tread surface may be flat or of any shape and may be formed with transverse grooves, ribs or the like 10, and these may be so positioned as to alternate with the soft rubber studs 6 projecting from or flush with the tread when such studs 6 are employed.

When I construct the ring 8 in segments each segment may be screwed to the felly 11 to prevent their displacement.

In making up my tire cover which is made without any canvas lining but only of ordinary tire rubber, I make the opening on the inside periphery of the cover of a greater width than is required when secured on the rim or felly, and I make the soft rubber cushion of a size and shape to fit within the cover between the wood ring and inside of the tread surface of the cover so that when the thinner elements are placed in position with regard to each other and before being tightened on the rim there shall be a space on each side of the ring between it and the walls of the cover at that part as will be understood from Fig. 1, but when the beaded edges of the cover are pressed together by the side plates such spaces will be filled out by the portions of the cover at that part, and this action of pressing the edges of the cover together will compress the soft rubber in the cover, the pressure being exerted toward the tread surface of the cover to the shape of the ring next the soft rubber and at the same time this pressing of the edges of the cover together will, due to the resistance of the compressed soft rubber bed or base, effect a stretching or cause a tension on the side walls of the cover and when the whole are securely fixed to the wheel's rim the cover, soft rubber, and ring will be securely fixed together, the compression of the soft rubber and the stretching or tension on the side walls of the cover insuring a resiliency which makes the tire equal to a pneumatic tire.

What I do claim as my invention and desire to secure by Letters Patent is:—

1. A resilient tire for wheels of road vehicles consisting of a stretchable cover of tire rubber, a filling of softer rubber inside the stretchable cover, a ring of suitable material within the inner edges of the stretchable cover, the softer rubber being positioned between the ring and inner surface of the cover so that when the ring, soft rubber and the stretchable cover are positioned on the rim of a wheel and the cover is tightened at its inner edges to secure it to the rim of the wheel, the side walls of the cover having action on the soft rubber to force it toward the tread surface of the cover and so compress same while the action of tightening the stretchable cover will cause a stretch on the side walls of the cover due to the compression of the soft rubber.

2. A resilient tire for wheels of road vehicles comprising a stretchable cover of tire rubber, a rib of the same material as said cover formed on the tread surface of the latter, said rib being formed with a plurality of alined openings therein at regular intervals, a ring of suitable material within the inner edges of the stretchable cover and adapted to fit over the rim of the wheel, a filling of softer rubber inside the stretchable cover, studs formed by the soft rubber filling and projecting through the openings in the rib of said cover, and clencher members for securing the stretchable cover, soft rubber filling, and ring in position on the rim of the wheel and for tightening the stretchable cover around said soft rubber filling and ring, whereby said filling becomes compressed within the stretchable cover and the studs are forced beyond the tread surface of the rib, said cover being stretchable to constantly exert tension upon the soft rubber.

In testimony whereof I have hereunto set my hand in presence of two subscribing witnesses.

WILLIAM HAZELWOOD CARMONT.

Witnesses:
H. D. JAMESON,
R. J. WILLIAMS.